United States Patent [19]
Psaltis et al.

[11] Patent Number: 5,671,073
[45] Date of Patent: Sep. 23, 1997

[54] HOLOGRAPHIC STORAGE USING SHIFT MULTIPLEXING

[75] Inventors: Demetri Psaltis; Michael J. Levene; Allen Pu; George Barbastathis, all of Pasadena, Calif.

[73] Assignee: California Institute of Technology, Pasadena, Calif.

[21] Appl. No.: 389,890

[22] Filed: Feb. 15, 1995

[51] Int. Cl.$^6$ .............................. G03H 1/26; G03H 1/12; G11C 13/04; G11B 7/00

[52] U.S. Cl. .................. 359/22; 359/10; 359/11; 359/24; 359/29; 359/30; 365/125; 369/103; 369/275.1

[58] Field of Search ...................... 359/10, 11, 19, 359/22, 24, 25, 28, 29, 30; 365/125, 216, 234, 235; 369/103, 275.1, 284

[56] References Cited

U.S. PATENT DOCUMENTS

| | | | |
|---|---|---|---|
| 4,295,162 | 10/1981 | Carlsen | 358/342 |
| 4,420,829 | 12/1983 | Carlson | 369/103 |
| 4,550,395 | 10/1985 | Carlson | 369/103 |
| 4,701,005 | 10/1987 | Noguchi | 359/17 |
| 5,481,523 | 1/1996 | Dewald | 369/103 |

*Primary Examiner*—Paul M. Dzierzynski
*Assistant Examiner*—Darren E. Schuberg
*Attorney, Agent, or Firm*—Michaelson & Wallace

[57] ABSTRACT

The invention is embodied in a method of recording successive holograms in a recording medium, using at least a fan of M waves along at least a first axis with a separation angle between adjacent waves and directing the fan of M waves as a reference beam along a reference beam path onto the recording medium, successively modulating a wave with a succession of images to produce a succession of signal beams along a signal beam path lying at a propagation angle relative to the reference beam path so that the signal and reference beams intersect at a beam intersection lying within the medium, the beam intersection having a size corresponding to beam areas of the reference and signal beams, producing a succession of relative displacements in a direction parallel to the first axis between the recording medium and the beam intersection of the signal and reference beam paths in synchronism with the succession of signal beams, each of the displacements being less than the size of the intersection whereby to record successive holograms partially overlapped along a direction of the displacements.

14 Claims, 7 Drawing Sheets

HOLOGRAPHIC STORAGE USING SHIFT MULTIPLEXING

BACKGROUND OF THE INVENTION

Origin of the Invention

The U.S. Government has certain rights in this invention pursuant to Grant No. F49620-92-J-0400 awarded by the United States Air Force.

TECHNICAL FIELD

The present invention relates to holographic memories, holographic storage systems and holographic processors.

BACKGROUND ART

The traditional advantages of 3-D holographic memories are high storage density and parallel access capability. These features were recognized in the early 1960's and serious efforts towards the practical implementation of such memories were undertaken. Unfortunately, these efforts did not produce commercially viable memories. In recent years there has been a resurgence of interest in 3-D optical storage due to a considerable improvement in the understanding and availability of storage media, a dramatic improvement in optoelectronic components in general, and most importantly, the emergence of applications, such as image processing, neural networks, and data bases where the capabilities of these memories can be effectively utilized. This recent activity has culminated in the storage of $10^4$, 320×220-pixel holograms in a volume roughly equal to 2 cm$^3$. If spatial light modulators with 1 million pixels are used, then the storage density achievable today is in excess of $10^9$ bits per cm$^3$.

Volume holograms are usually recorded using angular, wavelength, phase code, and spatial multiplexing. In addition, peristrophic multiplexing, a holographic technique that applies to either thin or thick (3-D) media, was recently introduced. Any of these methods, or certain combinations of them, can be used to multiplex holograms for holographic storage devices. All of these methods employ a reference beam consisting of a single plane wave, which may have a phase code imprinted on the wavefront.

It is an object of the present invention to exploit the use of non-plane waves in the reference beam to implement multiplexing. It is a further object of the invention to perform multiplexing without requiring anything more than a relative translation between the holographic recording media and optical (signal and reference) beams.

SUMMARY OF THE INVENTION

The invention is embodied in a method of recording successive holograms in a recording medium, using at least a linear fan of M waves along a first axis with a separation angle between adjacent waves and directing the fan of M waves as a reference beam along a reference beam path onto the recording medium, successively modulating a wave with a succession of images to produce a succession of signal beams along a signal beam path lying at a propagation angle relative to the reference beam path so that the signal and reference beams intersect at a beam intersection lying within the medium, the beam intersection having a size corresponding to beam areas of the reference and signal beams, producing a succession of relative displacements in a direction parallel to the first axis between the recording medium and the beam intersection of the signal and reference beam paths in synchronism with the succession of signal beams, each of the displacements being less than the size of the intersection whereby to record successive holograms partially overlapped along a direction of the displacements. Preferably, the first axis and the signal beam path are parallel and the separation angle of the fan of M waves is at least approximately equal to the beam wavelength divided by the product of the medium thickness and the tangent of the propagation angle. Preferably, each of the relative displacements is of a length at least approximately equal to the wavelength divided by the product of M is multiplied by the separation angle. The method preferably includes temporarily halting the succession of signal beams after a predetermined number of the relative displacements have been produced and moving the recording medium and the beam intersection relative to one another until the beam intersection does not intersect the first one of the holograms recorded with the succession of relative displacements, and then resuming the producing of a succession of signal beams and the producing of a succession of relative displacements. Preferably, the predetermined number of relative displacements is equal to M.

The fan of M waves include waves within the class of radiation waves including plane waves, cylindrical waves and elliptical waves. The recording medium may be disk-shaped and the successive relative displacements are achieved by rotating the recording medium. In an alternative embodiments M is equal to infinity whereby the fan of M waves is a single spherical wave.

In a two-dimensional shift multiplexing embodiment, the reference beam is a two-dimensional fan of waves, the linear fan of M waves being included within the two-dimensional fan of waves, the two dimensional array including M waves along the first axis and N waves along a second axis, the M waves of the first axis being separated by the separation angle and the N waves of the second axis being separated by an other separation angle, the method further including producing an other relative displacement between the recording media and the beam intersection in a direction parallel to the second axis, the other relative displacement being less than the size of the beam intersection. Preferably, the second axis and the signal beam path are approximately normal to one another and the other separation angle is approximately equal to the square root of the quotient of the wavelength of the reference beam divided by the thickness of the recording medium. Moreover, the other relative displacement is approximately the wavelength of the reference beam divided by the product of N multiplied by the other separation angle. The recording medium may be disk-shaped, the tracks may be circular and the second axis lies in a radial direction relative to the disk-shaped recording medium, whereby successive tracks partially overlap along the radial direction.

The holograms include one of (a) image plane holograms, (b) Fourier transform holograms, (c) Fresnel plane holograms.

The fan of M waves may be provided by diffracting a single beam into a line of plural wave sources separated by a spacing, and focusing the plural wave sources through a lens having a focal length, the focal length and the spacing being a function of the separation angle. In this case, the lens may be one of (a) spherical, (b) elliptical, (c) cylindrical so that the fan of M waves are one of (a) plane waves, (b) elliptical waves, (c) cylindrical waves, respectively. Alternatively, the reference beam is a spherical wave provided by focusing a coherent plane wave beam through a spherical lens, so that M is infinity.

In accordance with another aspect, the invention is embodied in a method of reconstructing at a detection plane successive holograms previously recorded in a recording medium by diffracting a succession of signal beams with a reference beam including a linear fan of M waves, the linear fan being parallel to the path of the signal beams and having a separation angle between adjacent waves of the fan, while successively displacing the medium relative to the signal and reference beams in a direction parallel to the first axis by a distance less than the intersection of the reference and signal beams in the recording medium in synchronism with the succession of signal beams, the method of reconstructing including: providing at least a linear fan of M waves along a first axis corresponding to the direction of the reference beam with which the holograms were previously recorded with a separation angle between adjacent waves and directing the fan of M waves as a reference beam along a reference beam path onto the recording medium, producing a succession of relative displacements in a direction parallel to the first axis between the recording medium and the beam intersection of the signal and reference beam paths in synchronism with the succession of signal beams, each of the displacements being equal to the distance of the displacements with which the holograms were previously recorded, and detecting at the reconstruction plane light diffracted from the reference beam by a succession of the previously recorded holograms.

BRIEF DESCRIPTION OF THE DRAWINGS

FIG. 5 is a diagram of an output face of a point source array employed in the embodiment of FIG. 4.

DETAILED DESCRIPTION OF THE PREFERRED EMBODIMENTS

The present invention multiplexes holograms using a reference beam consisting of a spectrum of plane waves (similar to phase code multiplexing, for example). Multiplexing is achieved by shifting (translating) the recording medium with respect to the signal and reference beams. Alternatively the two beams can be translated in tandem with respect to the stationary medium.

Figure 1:
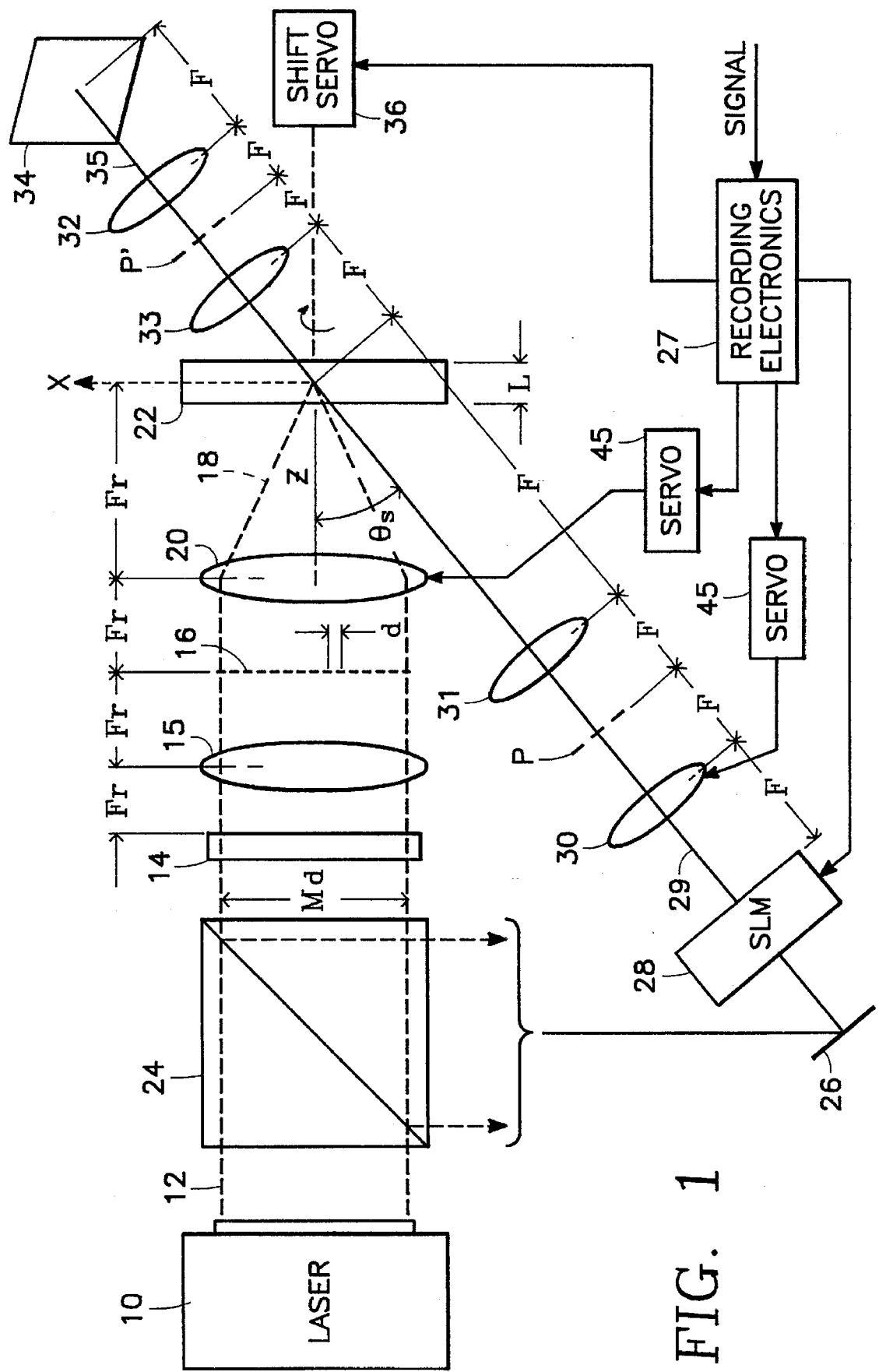
FIG. 1 is a schematic block diagram of a holographic storage system in accordance with one embodiment of the invention employing multiple plane waves in the reference beam.

FIG. 1 illustrates a holographic memory system in accordance with a first embodiment of the invention. A laser 10 furnishes a laser beam 12 to a diffractive element 14 which produces from the laser beam 12 an array of M plane waves. The M plane waves are then Fourier transformed by a spherical lens 15 into M beam sources 16 separated by uniform distances d. The light from the array of M beam sources 16 is transformed into a one-dimensional fan of M plane waves 18 by a spherical lens 20. The fan of plane waves 18 constitutes the reference beam for holographic recording and reproduction. The diffractive element 14 could be a Dammann grating of the type disclosed in Dammann et al., "High Efficiency In-Line Multiple Imaging by Means of Multiple Phase Holograms," *Optics Communications*, Vol. 3, No. 5 pages 312–315 (July 1971). However, in one implementation, the diffractive element 14 was a hologram with similar properties. The spherical lenses 15 and 20 have focal lengths $F_r$ and image the reference beam emanating from the diffractive element 14 onto a recording spot in an optical recording medium 22. As indicated in FIG. 1, the distances between (a) the diffractive element 14 and the center of the spherical lens 15, (b) the center of the spherical lens 15 and the plane of beam sources 16, (c) the plane of beam sources 16 and the center of the spherical lens 20, and (d) the center of the spherical lens 20 and the plane of the recording medium 22 are each preferably $F_r$.

A beam splitter 24 splits the laser beam 12 between the diffractive element 14 and a mirror 26. That portion of the laser beam 12 diverted to the mirror 26 is modulated by a spatial light modulator 28 to provide a signal beam 29 for recording a hologram in the optical recording medium 22.

During recording of a hologram in the medium 22, recording electronics 27 controls the spatial light modulator 28 in accordance with an information signal representing either an image or an array of data. The signal beam 29 is imaged by spherical lenses 30 and 31, each of focal length F, onto the same recording spot in the medium 22 that is illuminated by the reference beam 18. The distances between (a) the spatial light modulator 28 and the center of the spherical lens 30, (b) the center of the spherical lens 30 and a half-way point P with the center of the next spherical lens 31, and (c) the center of the spherical lens 31 and the recording spot in the medium 22 are each preferably a uniform displacement F.

For reconstruction of a hologram previously recorded in the recording medium 22, the reference beam 18 is applied as illustrated in FIG. 1 while the signal beam 29 is blocked. The diffracted beam 35 emanating from the recording medium 22 is imaged through spherical lenses 32 and 33, each of focal length F, onto the plane of a detector 34. The distances between (a) the recording spot in the medium 22 and the center of the lens 32, (b) the center of the lens 32 and a midpoint P' with the center of the next lens 33, (c) the midpoint P' and the center of the lens 33 and (d) the center of the next lens 33 and the plane of the detector 34 are each preferably the uniform displacement F. The detector 34 may be an array of image pixels such as a charge coupled device image detector. A servo 36 under control of the recording electronics 27 governs the amount of shift between the medium and the optical beams 18, 29 with the recording of successive holograms.

The description of the preceding two paragraphs with reference to FIG. 1 is pertinent to image plane holography using a 4-F imaging system. Alternatively, imaging can be performed using a single lens of focal length F located a distance $d_i$ from the SLM 28 and a distance $d_o$ from the recording medium 22, the distances $d_i$ and $d_o$ satisfying the lens law with respect to the lens focal length F: $d_o^{-1}+d_i^{-1}=F^{-1}$. The same method of using a single lens can be used for imaging the reconstruction of holograms onto the CCD sensor 34.

Alternative holographic methods include Fourier holography and Fresnel holography. To implement Fourier plane holography, we remove the lenses 30 and 32 and align the SLM 28 on the mid-point denoted by P in FIG. 1 (which is a distance F from the lens 31) for recording; and we align the CCD sensor 34 on the plane P' (which is a distance F from the lens 33) for reconstruction. In that case, the Fourier transform of the signal beam (as modulated by the SLM 28) appears through the lens 31 on the plane perpendicular to the signal beam axis PP' intersecting the center of the recording material 22, and is recorded as a hologram. On the other hand, the reconstruction undergoes a second Fourier transform (by the lens 32) forming the original image (inverted) on the CCD sensor 34. To implement Fresnel plane holography, we alter the Fourier plane geometry as follows: In FIG. 1, the lenses 30 and 32 are not present, the SLM is located at plane P and the CCD sensor 34 is located at plane P', the recording medium 22 is located a distance $d_1$ from the lens 31 and a distance $d_2$ from the lens 33 such that $d_1+d_2=2F$. (The special case of $d_1=d_2=F$ reduces to Fourier plane holography.) The operation in the Fresnel holography case is similar to that of the Fourier holography case, except that a defocused version of the Fourier transform is recorded as a hologram. In the remaining portion of the description of FIG. 1, it will be assumed that Fourier transform holograms are being recorded or reconstructed, so that the lenses 30 and 32 depicted in FIG. 1 are not present, the SLM 28 is located on the plane P, and the CCD sensor 34 is located on the plane P'.

The reference beam 18 originates from the array 16 of M point sources located in the front focal plane of the Fourier lens 20, and centered around the optical axis z. The lens 20 transforms the field into the fan 18 of M plane waves. The angular separation is uniform, given by $\Delta\theta \approx d/F_r$ where d is the distance between successive point sources and $F_r$ is the focal length. Thus the angle of incidence of the m-th component is:

$$\theta_m \approx \left( m - \frac{M-1}{2} \right) \Delta\theta \quad (1)$$

$$m = 0, \ldots, M-1$$

The signal beam 29 will have more than one angular component because of the modulation imposed by the spatial light modulator 28. The angle of incidence of the central component of the signal beam with respect to the z-axis is denoted by $\theta_S$. Because the reference consists of M plane waves, the recorded image may be thought of as consisting of M separate holograms recorded simultaneously with the same signal beam. During reconstruction, each plane wave in the reference fan 18 reads out not only the hologram it recorded, but also all the holograms recorded by the other plane waves of the reference fan. These additional reconstructions, or "ghosts", produce images that are shifted with respect to the primary reconstruction, due to the change in read-out angle relative to the recording angle. The ghosts are Bragg mismatched by an amount roughly proportional to the angular separation between the plane wave component that originally recorded the hologram and the component that is reconstructing it. For the hologram recorded between the central signal component and the m=0-th reference component the amount of Bragg mismatch is $\Delta k_z = 2\pi l \tan\theta_S \Delta\theta/\lambda$ when read out by the ±1-th reference component. The same relation holds approximately for the other holograms. The diffraction efficiency of these Bragg mismatched holograms is proportional to $$\eta(\Delta k) = \mathrm{sinc}^2\left( \frac{\Delta k_z L}{2\pi} \right) \quad (2)$$

where sinc $(\chi)=\sin\pi\chi/(\pi\chi)$ and L is the thickness of the recording medium.

It follows that by choosing the angular separation $\Delta\theta$ between the reference components such that the sinc function of eq. 2 vanishes, the ghosts will be eliminated, leaving a clean reconstruction. From eq. 2 the required separation is:

$$\Delta\theta \approx \frac{\lambda}{L\tan\theta_S} \quad (3)$$

This equation constrains the design of the diffractive element 14 in that, for a given focal length $F_r$ of the lens 20, the separation d between adjacent point sources 16 must be $$d \approx \frac{F_r\lambda}{L\tan\theta_S} \quad (4)$$

in the paraxial approximation.

Having eliminated the ghosts, this specification now examines what happens to the diffracted light if the hologram is shifted by a distance $\gamma$ in the $\chi$-direction. The diffracted field $\epsilon_d$ is obtained by multiplying the illuminating reference (consisting of M plane waves) by the expression for the M recorded holograms shifted by $\gamma$. For a hologram recorded with a single plane wave signal beam of incidence angle $\theta_S$, the diffracted field at the reconstruction plane is:

$$\epsilon_d = \sum_{m=0}^{M-1} \exp\left\{ j2\pi\frac{m\Delta\theta x}{\lambda} \right\} \times \quad (5)$$

$$\sum_{m'=0}^{M-1} \exp\left\{ -j2\pi\frac{m'\Delta\theta(x-\gamma)}{\lambda} \right\} \times$$

$$\exp\left\{ j2\pi\sin\theta_S\frac{x-\gamma}{\lambda} \right\}$$

$$\approx \left( \sum_{m=0}^{M-1} \exp\left\{ j2\pi\frac{m\Delta\theta\gamma}{\lambda} \right\} \right) \exp\left\{ j2\pi\sin\theta_S\frac{x-\gamma}{\lambda} \right\} \quad (6)$$

The three dimensional nature of the hologram (i.e. the z dependence and the constraint imposed on the angular separation between plane waves within the fan 18 by Equation 4) serves to eliminate the cross-terms m≠m' (ghosts) from the double summation. From eq. 6, the diffracted field consists of the reconstruction of the signal at angle $\theta_S$ weighted by a sum leading to the familiar array function.

Therefore the intensity of the diffracted field as a function of shift is:

$$I(\gamma) \propto \frac{\sin^2\left(\pi M \frac{\gamma \Delta\theta}{\lambda}\right)}{\sin^2\left(\pi \frac{\gamma \Delta\theta}{\lambda}\right)} \quad (7)$$

The zeros of the array function occur at $$\gamma_p = p \frac{\lambda}{M\Delta\theta}, p = 1, \ldots, M-1 \quad (8)$$

Multiplexing is performed by recording each successive hologram (corresponding to a successive image on the light modulator 28) with a spatial shift $\gamma=\lambda/M\Delta\theta$ with respect to its two neighbor holograms. Because of the periodicity of the array function, at maximum M holograms can be superimposed on the same location for multiplexing along the $\chi$ direction in the drawing of FIG. 1. The period is:

$$\gamma M = \frac{\lambda}{\Delta\theta} \quad (9)$$

The shift multiplexing method is particularly well-suited for the implementation of holographic 3-D disks. A 3-D disk can be readily implemented with this method by simply using the disk rotation (which is already part of the system intended to allow accessing of information on different locations on the disk surface) in order to implement the shift. This simplifies the design of the head since no additional components are required for selective readout.

Figure 2:
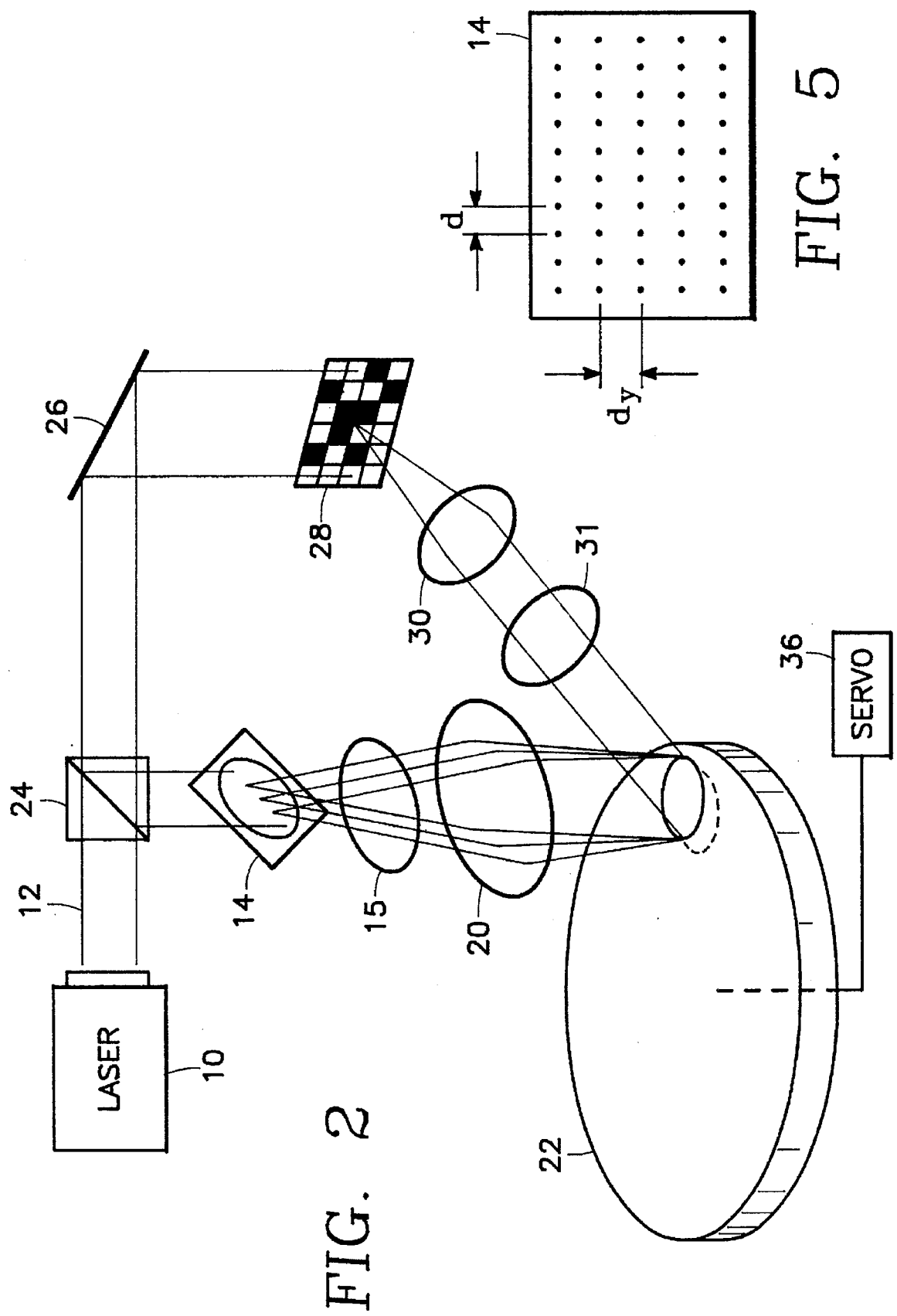
FIG. 2 is a diagram illustrating an embodiment of the invention employing disk-shaped recording media for multiplexing in the along-track direction.
Figure 3:
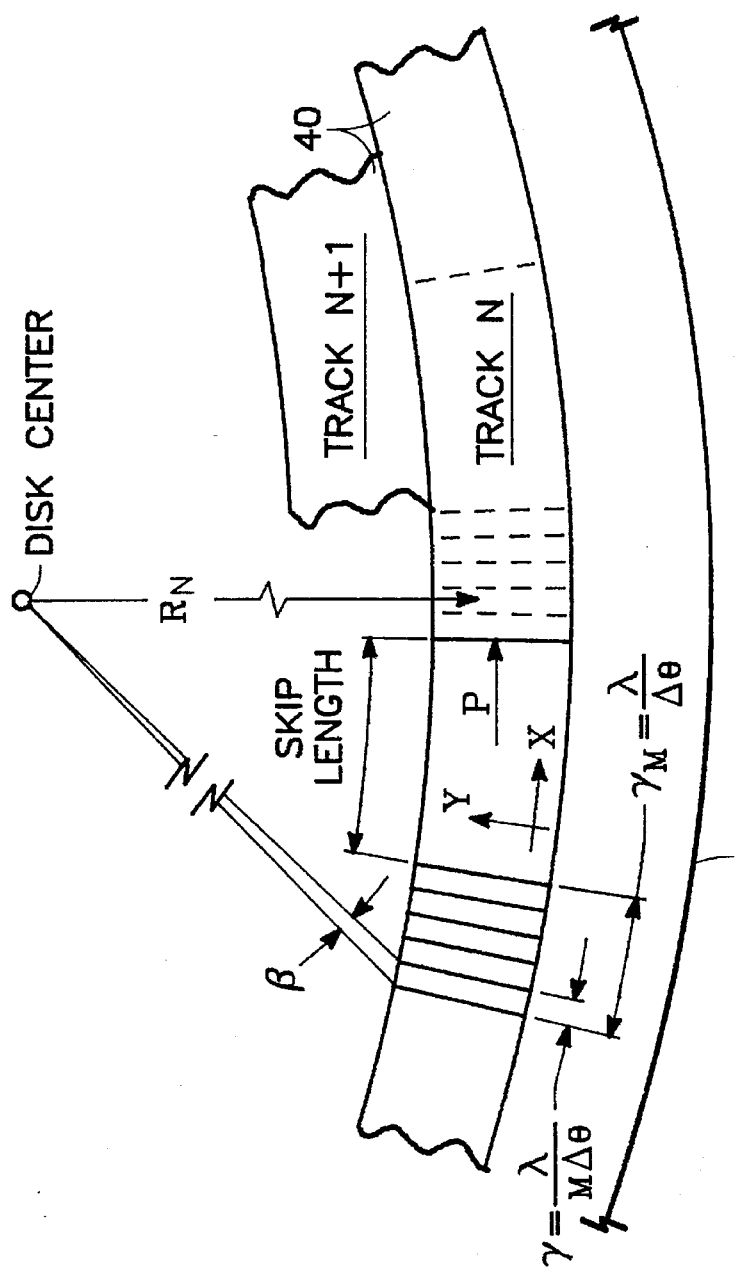
FIG. 3 is a diagram illustrating the placement of successive holograms on a disk media.

FIG. 2 illustrates how the embodiment of FIG. 1 is implemented in accordance with the foregoing using a disk medium rotated by the servo 36 of FIG. 1 under control of the recording electronics 27 of FIG. 1. In the embodiment of FIG. 2, it may be possible to eliminate the lenses 15, 20, depending upon the selected characteristics of the diffractive element 14. FIG. 3 illustrates the placement of successive holograms within the recording medium 22. Referring to FIG. 3, the medium 22 is an optical disk divided into plural longitudinal circular tracks 40 labelled N, N+1, and so forth. In the embodiment of FIG. 3, adjacent tracks do not overlap but may be arbitrarily close together. As shown in track N, a series of M (in this case M=5) holograms are recorded, the disk being rotated between subsequent recordings by an angle $$\beta = \frac{\lambda}{R_N M \Delta\theta}$$

where $R_N$ is the radius of track N. This corresponds to a spatial shift of $$\gamma = \frac{\lambda}{M\Delta\theta}$$

with the recording of each hologram. Then, after M holograms have been recorded within the period length $$\gamma M = \frac{\lambda}{\Delta\theta}$$

recording is temporarily halted while the disk is rotated until the beam spot (the intersection of the reference and signal beams in the medium 22) is beyond the boundary of the first-recorded hologram in the series of M holograms previously recorded in the period length $\gamma_M$. Then, the entire process is repeated, with M new holograms being recorded (indicated in dashed line in FIG. 3). The "skip" length by which the disk is rotated while recording is temporarily halted is the length $L_h$ of one hologram (as measured in the plane of the surface of the disk) minus M×the shift displacement between successive holograms $\gamma$, or $L_h - M_\gamma$. In this way, no spot along the entire length of the track has more than M holograms multiplexed along the x-direction.

Preferably, the foregoing recording process is implemented by the shift servo 36 under the control of the recording electronics 27. Specifically, the recording electronics 27, which may comprise, for example, a programmed microprocessor, causes the servo 36 to rotate the disk media 22 to a first position, at which time the recording electronics 27 causes the spatial light modulator to transmit a first image on the laser beam 29. The image is then recorded on the media 22. Thereafter, the servo 36 rotates the disk media 22 by the shift displacement $\gamma$. Thereafter, the recording electronics causes the spatial light modulator to transmit the next image on the laser beam 29. The foregoing process is repeated until M holograms have been recorded in this manner, at which time the recording electronics 27 causes the servo 36 to rotate the disk by the skip length $L_h - M_\gamma$ before recording the next series of holograms. Once an entire track (for example track N) has been filled, the recording electronics 27 causes servoes 45 controlling optical elements in the paths of the reference and signal beams (such as the reference lens 20 and the signal lens 30) to move so as to radially move the beam spot at which the signal and reference beams intersect inside the disk media 20 by the width of one track (i.e., by the width of one beam spot).

The size of each hologram along one side (as measured in a plane perpendicular to the signal beam) may be expressed as the number of pixels $N_P$ along each side of the hologram multiplied by the pixel size $\delta$, or $N_P\delta$. However, as measured in a plane parallel to the surface of the disk media 22, the size of one hologram is $L\tan\theta_S + N_P\delta/\cos\theta_S$. The first term $L\tan\theta_S$ is attributable to the angle $\theta_S$ between the reference beam and the z-axis. The factor $\cos\theta_S$ is attributable to fact that the signal beam is slanted with respect to the plane of the disk media 22.

Preferably, the projection of the signal beam 29 onto the disk is a straight line which is parallel to the $\chi$-direction or direction of motion of the disk near the hologram being recorded. This optimizes selectivity along the $\chi$-direction.

Figure 4:
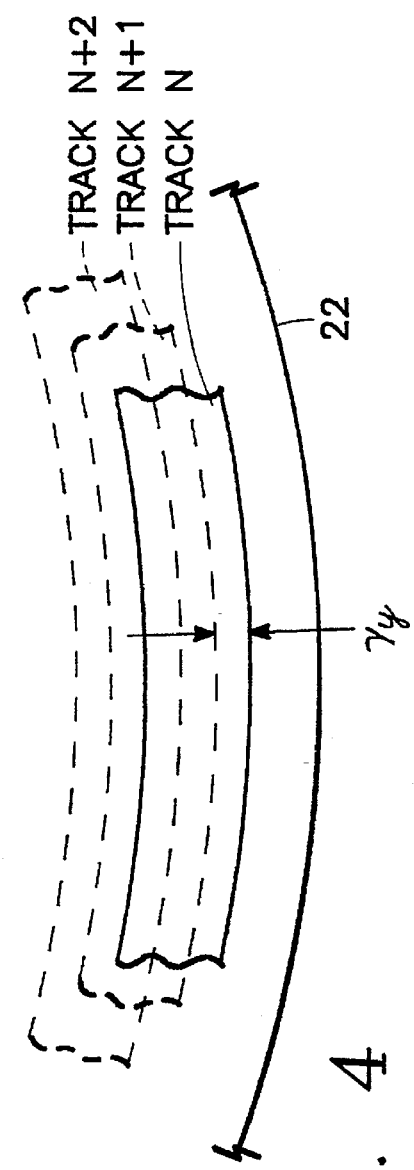
FIG. 4 is a diagram correspoding to FIG. 3 illustrating how tracks are overlapped by multiplexing in the radial direction.

While the embodiment of FIG. 3 has no overlapping of adjacent tracks (i.e., multiplexing of holograms along the radial or y-direction), overlapping of adjacent tracks may be achieved as illustrated in FIG. 4 by selecting a diffractive element 14 which provides a two-dimensional array of beam sources 16 rather than the line of beam sources disclosed hereinabove. The limitation on the spacing $\gamma_y$ between adjacent holograms along the radial or y-direction is governed by the same principles as those discussed above with respect to the spacing $\gamma$ along the x- direction, with the exception that required angular separation of the fan of reference beams along the radial or y-direction is:

$$\Delta\theta_y = \sqrt{\frac{\lambda}{L}}.$$

The output face of the Dammann grating or diffractive element 14 as Fourier transformed by the lens 15 is illustrated in FIG. 5, in which the spacing between point sources in the along-track or x-direction is $$d = \frac{F_r \lambda}{L \tan \theta_S} \qquad (10)$$

as stated above, while the spacing in the radial or y-direction is $$d_y \approx F_r \sqrt{\frac{\lambda}{L}} \qquad (11)$$

In the two-dimensional array diffractive element 14 of FIG. 5, the number of point sources M in the along-track or x-direction may be greater than the number of point sources $M_y$ in the radial or y-direction. Thus, the incremental shift spacing $\gamma$ between successive holograms along the x-direction is as given above, namely $\gamma = \lambda/M\Delta\theta$, while along the y-direction the incremental shift spacing $\gamma_y$ between successive holograms is $\gamma_y = \lambda/M_y \Delta \theta_y$, where $\Delta\theta_y \approx d_y/F_r$.

The storage density D per unit area that the invention can achieve in the embodiment of FIG. 1 is determined by the thickness-dependent angular selectivity (eq. 10), the number of beams M allowed by the optics, the page size $N_P\delta$ ($\delta$ is the pixel size and $N_P$ the number of pixels) and the periodicity of the array function. An approximate formula for the density is:

$$D = \frac{M \cos\theta_S}{\delta^2(1 + M\gamma \cos\theta_S/N_P\delta)} \qquad (12)$$

when shift-multiplexing in one dimensional only.

For L=100 μm and signal incidence angle $\theta_S$=30°, usage of F/1 optics allows M=100 holograms. Then, for typical page parameters $N_P$=1000, $\delta$=2 μm, eq. 12 yields D=21.1 bits/μm².

Figure 6:
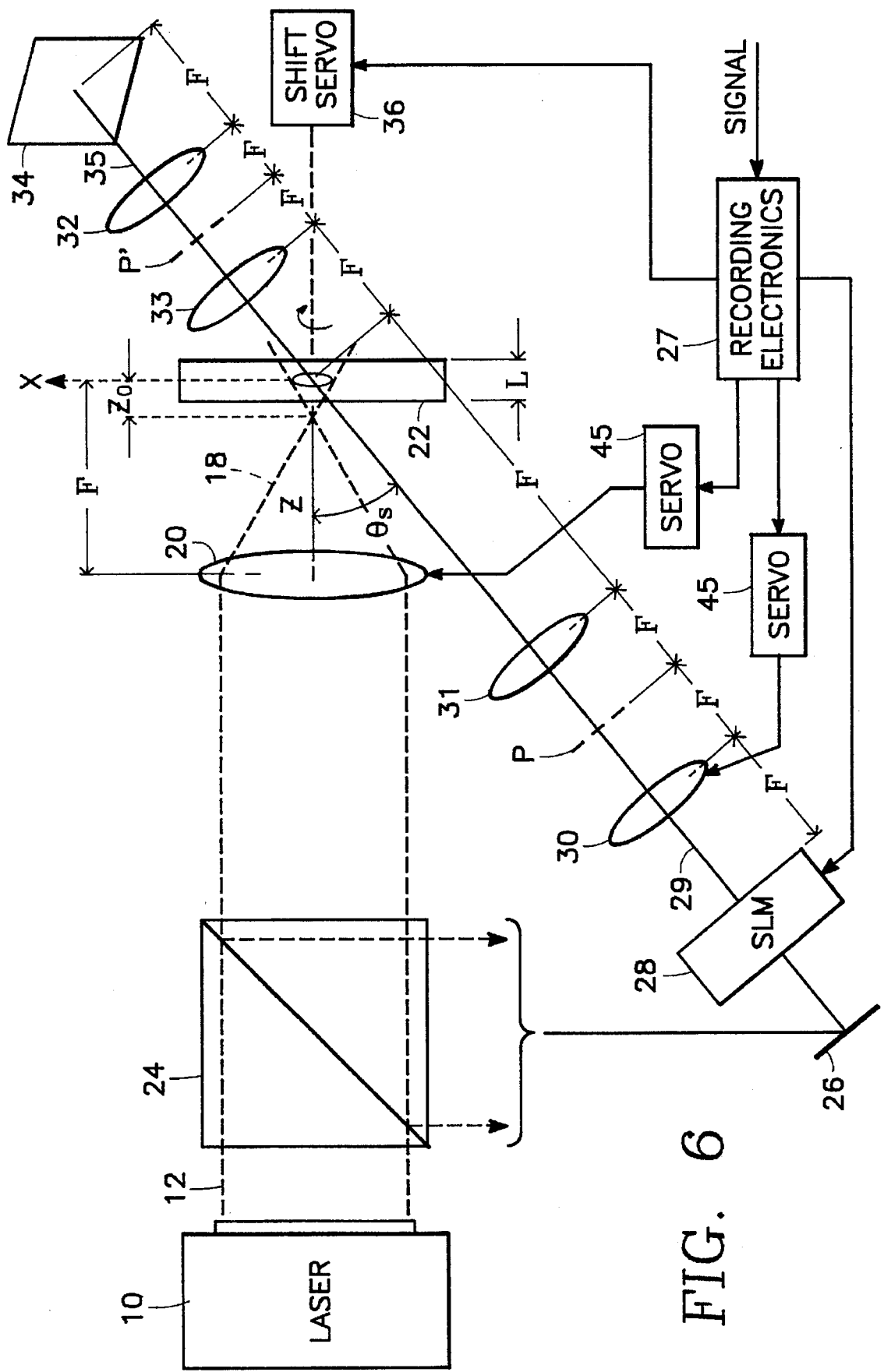
FIG. 6 is a schematic block diagram corresponding to FIG. 1 of another embodiment employing a single spherical wave in the reference beam.

In the embodiment of FIG. 6, shift multiplexing is implemented using a spherical wave reference instead of the fan of M plane waves. The Dammann grating or diffractive element 14 is removed so that the spherical lens 20 provides a single spherical wave as the reference beam 18. The spherical wave reference beam of this embodiment is a special case of the multiple plane wave embodiment of FIG. 1 in which there are at least nearly an infinite number of plane waves distributed in a two-dimensional plane and separated by infinitely small separation angles. The analysis of the embodiment of FIG. 6 is as follows: Consider a spherical reference wave originating a distance $z_0$ from the center of the recording material and a plane wave signal incident at angle $\theta_S$ with respect to the optical axis. The displacement $z_0$ is preferably selected so that the reference beam spot size matches the signal beam spot size at their intersection within the media 22. An approximate calculation (under the paraxial and Born approximations and neglecting variable modulation depth) predicts that the shift selectivity is related to the focal distance and the Bragg angular selectivity (eq. 10) as $\gamma_{Bragg} \approx z_0 \Delta\theta = \lambda z_0/L \tan\theta_S$. The finite numerical aperture (NA) broadens the selectivity curve by a factor of $\gamma_{NA} \approx \lambda/2(NA)$. Therefore we have:

$$\gamma_{spherical} = \gamma_{Bragg} + \gamma_{NA} \approx \frac{\lambda z_0}{L \tan\theta_S} + \frac{\lambda}{2(NA)} \qquad (13)$$

One advantage of the single spherical wave embodiment of FIG. 6 is that the spherical wave reference beam corresponds to a two-dimensional fan of an infinite number of plane waves each of infinitesimal power with an infinitesimally small separation angle between waves, so that there is no periodicity (i.e., $\gamma_M$ is infinite) and two-dimensional multiplexing (as in FIG. 5) may be performed if desired because of the two-dimensional nature of the spherical wave reference beam.

Figure 7:
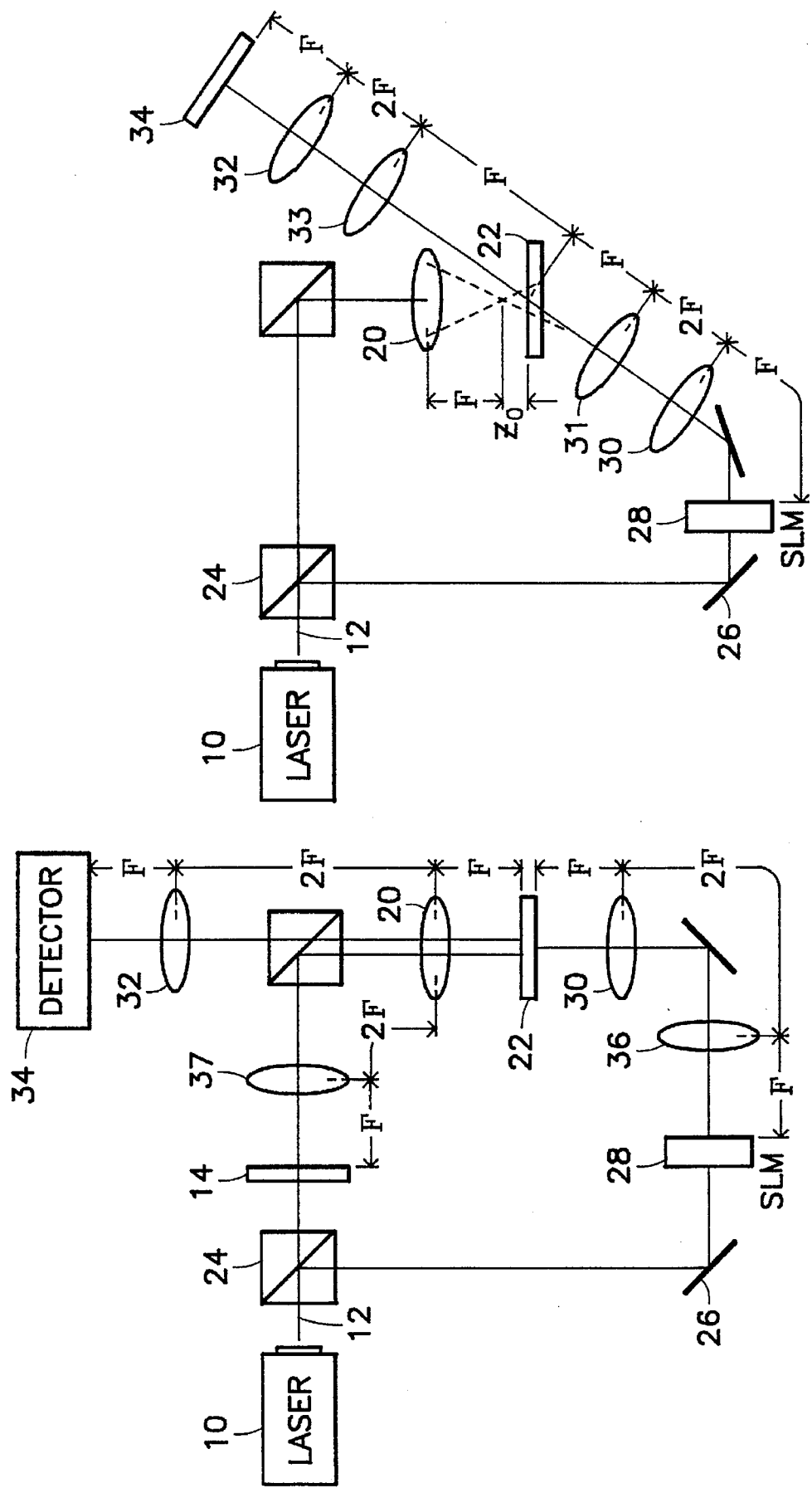
FIG. 7A is a schematic block diagram illustrating a variation of the embodiment of FIG. 1 in which the signal and reference beams illuminate opposite sides of the recording film.
FIG. 7B is a schematic block diagram illustrating a variation of the embodiment of FIG. 6 in which the signal and reference beams illuminate opposite sides of the recording film.

FIG. 7A illustrates an arrangement in which the signal and reference beams in the embodiment of FIG. 1 illuminates opposite sides of the recording medium 22 and are at least nearly coaxial. The beam splitter 24 separates the reference beam from the reconstructed beam during hologram reconstruction. The lenses 20 and 37 image the diffractive element 14 onto the disk media 22, thus providing the reference beam. The lenses 30 and 36 image the spatial light modulator 28 onto the disk media 22, thus providing the signal beam. During hologram reconstruction, light to the spatial light modulator 28 is blocked while the lenses 20, 32 image the reconstruction onto the detector 34. The embodiment of FIG. 7A is useful for thin optical media such as polymer films on the disk 22.

FIG. 7B illustrates a variation of the geometry of the embodiment of FIG. 7A for using a spherical wave, in which the reference beam is perpendicular to the plane of the disk media 22 while the signal beam and reconstructed beams make an acute angle with the plane of the disk media 22. The embodiment of FIG. 7B is suitable for thick recording media such as a Lithium Niobate crystal.

Figure 8:
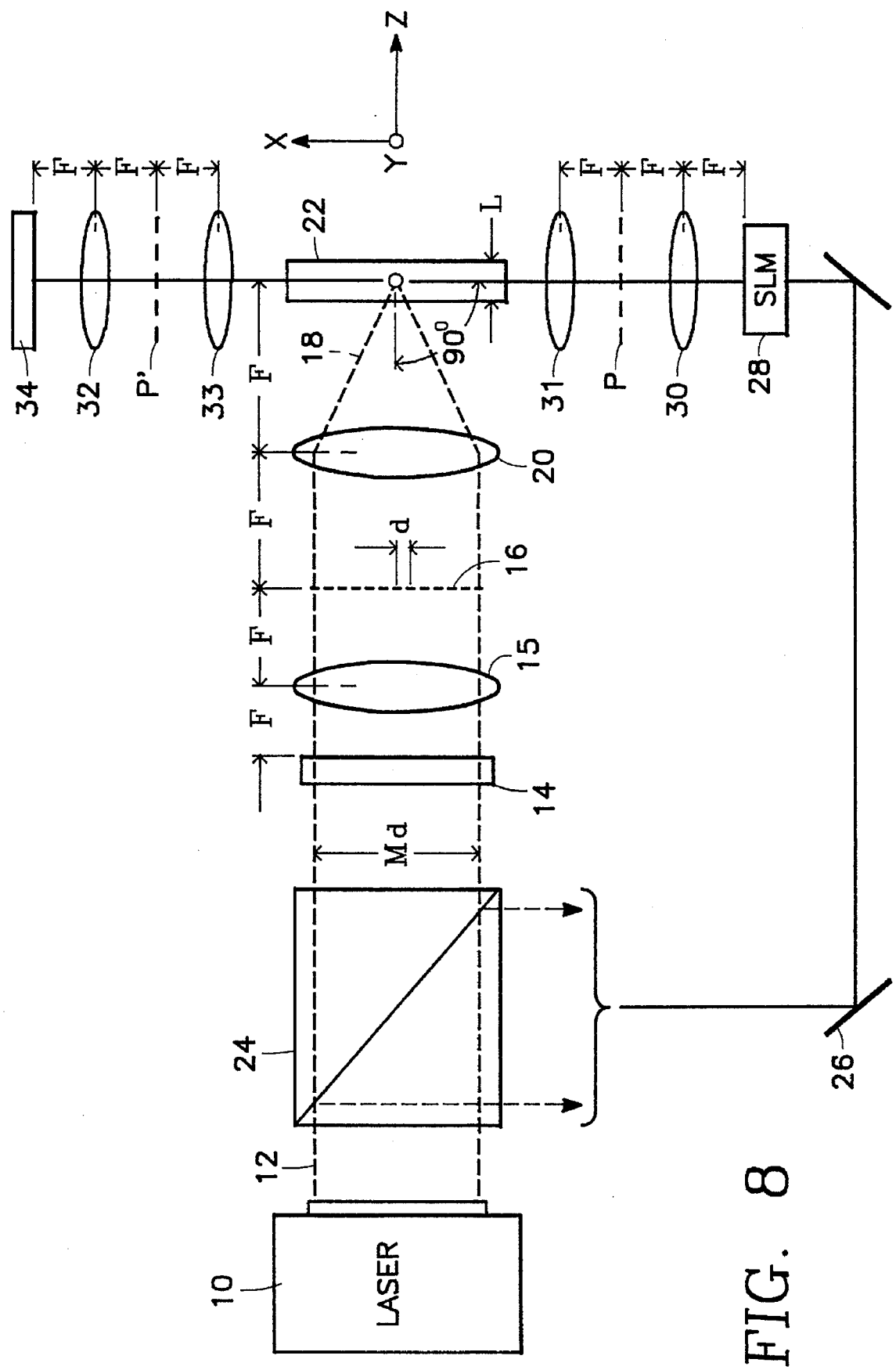
FIG. 8 is a simplified block diagram illustrating a variation of the embodiment of FIG. 1 or 6 in which the signal and reference beams are orthogonal.

FIG. 8 illustrates an arrangement in which the signal and reference beams of either the embodiments of FIGS. 1 or 6 are mutually perpendicular. The embodiment of FIG. 8 is useful for thick optical media such as a LiNO3 crystal. This embodiment achieves the theoretically smallest required shift distance. Experimentally, we have demonstrated shift selectivity of 2 μm in the X direction and 10 μm in the Y direction using an 8 mm thick Lithium Niobate crystal in implementing the embodiment of FIG. 8. The embodiment of FIG. 8 may be modified so that the reference beam is a single spherical wave (as in the embodiment of FIG. 6) by eliminating the diffusion element 14 and the lenses 15 and 20.

Figure 9:
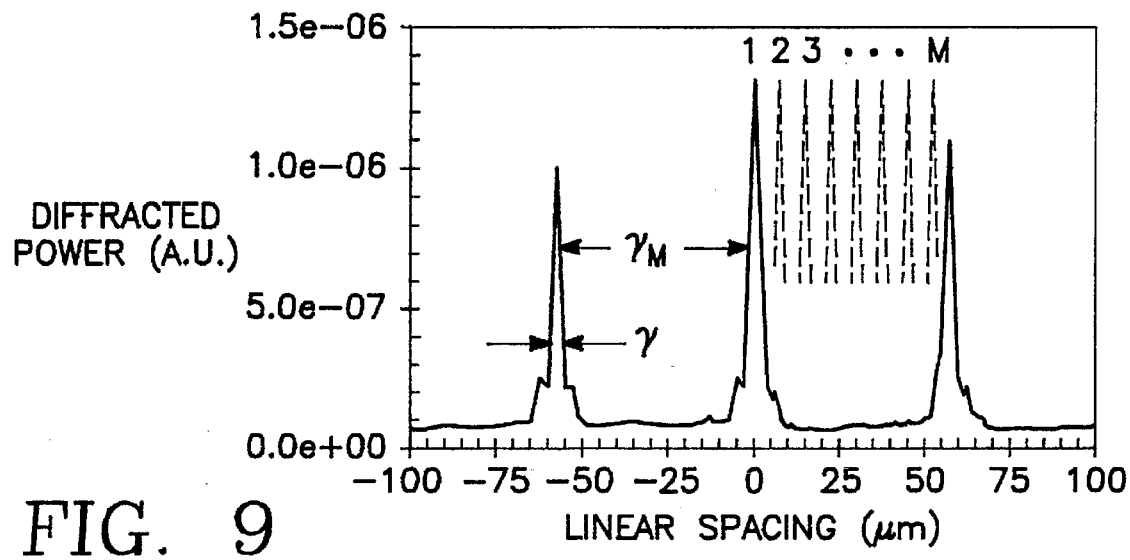
FIG. 9 is a graph illustrating the effect of shift along the x-direction on a hologram sensed at the reconstruction plane in the embodiment of FIG. 1.

A working example of the embodiment of FIGS. 1–3 was demonstrated using a reference fan of 20 plane waves angularly separated by 0.5°. The diffractive element 14 was a hologram rather than a Dammann grating. The recording material was DuPont HRF-150 polymer of thickness L=38 μm. The effect of shift on the reconstruction of a single hologram is shown in FIG. 9. The signal image was a 100×100 random bit pattern. For the particular parameters the theoretical shift selectivity is 2.8 μm and the period is 55 μm, in good agreement with the experiment. The reason the periodic reconstructios are weaker is the finite transverse size of the hologram of the diffractive element 14.

FIG. 9 is useful for illustrating the recording method of the invention. The peak width $\gamma$ is inversely proportional to the number M of the plane waves in the fan. The spacing between peaks $\gamma_M$ limits to M the number of other holograms (indicated in dashed line in FIG. 9) that can be stored between peaks of the first hologram.

Figure 10:
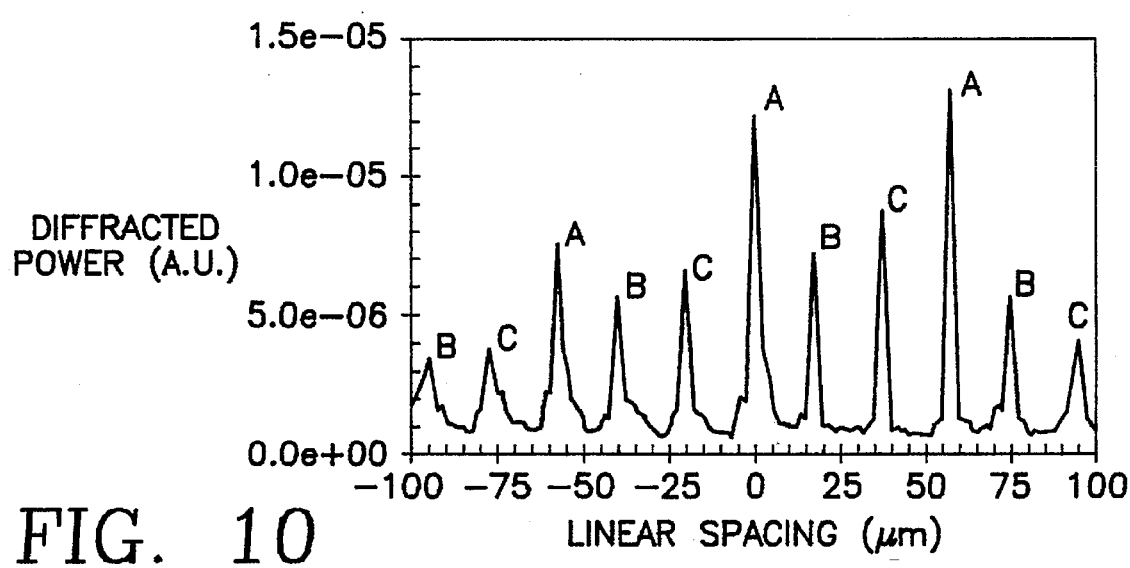
FIG. 10 is a graph illustrating the light intensity as a function of position in the x-direction as sensed at the reconstruction plane in the embodiment of FIG. 1 corresponding to three multiplexed holograms whose peaks are labelled, respectively, A, B, C in the graph.

The response at the reconstruction plane of the detector 34 for three holograms obtained with the embodiment of FIGS. 1–3 are shown in FIG. 10. Each hologram is reconstructed periodically, following its own array factor. Because of the very small thickness of the recording medium in this experiment, we used angular separation smaller than that predicted by eq. 10. Therefore the ghosts had to be filtered out in the Fourier plane in this example.

Figure 11:
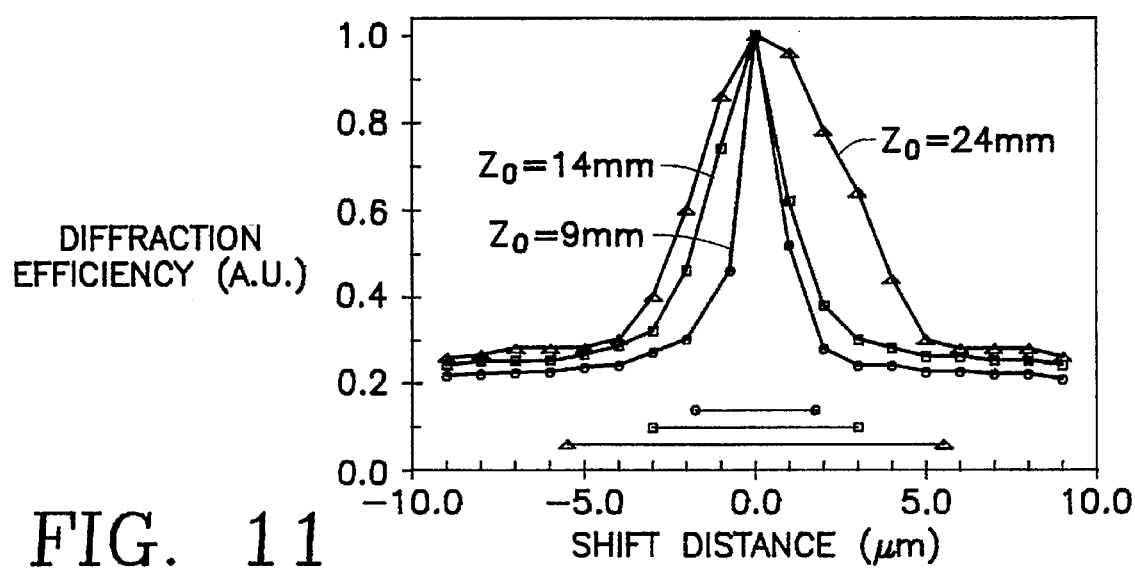
FIG. 11 is a graph illustrating the shift selectivity achieved in the embodiment of FIG. 6 for three different media-to-spherical wave source displacements and three different values of the numerical aperture of the spherical wave.

For the embodiment of FIG. 6, the graph of FIG. 11 shows the experimental shift selectivity curves for $z_0$=9, 14, 24 mm and NA of 0.3, 0.15, and 0.075, respectively. The angle of incidence of the signal beam was 40° outside the 8 mm thick iron doped LiNbO₃ crystal (refractive index n≈2.24). The experimental selectivity agrees with eq. 13.

While the invention has been described with reference to embodiments in which the reference lens 20 is spherical (so as to provide either a fan of plane waves as in FIG. 1 or a single spherical wave as in FIG. 6), the shift multiplexing of the invention described above may also be achieved using different types of reference beams other than a single plane wave. For example, cylindrical waves may be employed (in which case the reference lens 20 is a cylindrical lens) or elliptical waves may be employed (in which case the reference lens 20 is an elliptical lens). In general, the invention may employ any one of a large variety of non-planar reference waves to attain shift-selective properties in holographic reconstruction. Multiple plane waves and a spherical wave are but two examples of non-planar wavefronts, but the invention is not limited thereto. Clearly, any generalization of non-planar wavefronts may be employed in carrying out the invention.

While the invention has been described in detail by specific reference to preferred embodiments, it is understood that variations and modifications thereof may be made without departing from the true spirit and scope of the invention.

What is claimed is:

1. A method of recording successive holograms in a recording medium, comprising:

providing at least a fan of M amount of waves along at least a first axis with a separation angle between adjacent waves and directing said fan of M waves as a reference beam along a reference beam path onto said recording medium;

successively modulating a wave with a succession of images to produce a succession of signal beams along a signal beam path lying at a propagation angle relative to said reference beam path so that said signal and reference beams intersect at a beam intersection lying within said medium, said beam intersection having a size corresponding to beam areas of said reference and signal beams;

producing a succession of relative displacements a direction parallel to said first axis between said recording medium and said beam intersection of said signal and reference beam paths in synchronism with said succession of signal beams, each of said displacements being less than said size of said intersection whereby to record successive holograms partially overlapped along a direction of said displacements; and wherein said first axis and said signal beam path are parallel and said signal beam and said M amount of waves of said reference beam have a wavelength, said recording medium has a thickness and said separation angle of said fan of M waves is at least approximately equal to $$\frac{\lambda}{L \tan \theta_s},$$

wherein $\lambda$ is the wavelength, L is the thickness, and $\theta_S$ is the propagation angle.

2. A method of recording successive holograms in a recording medium, comprising:

providing at least a fan of M amount of waves along at least a first axis with a separation angle between adjacent waves and directing said fan of M waves as a reference beam along a reference beam path onto said recording medium;

successively modulating a wave with a succession of images to produce a succession of signal beams along a signal beam path lying at a propagation angle relative to said reference beam path so that said signal and reference beams intersect at a beam intersection lying within said medium, said beam intersection having a size corresponding to beam areas of said reference and signal beams;

producing a succession of relative displacements a direction parallel to said first axis between said recording medium and said beam intersection of said signal and reference beam paths in synchronism with said succession of signal beams, each of said displacements being less than said size of said intersection whereby to record successive holograms partially overlapped along a direction of said displacements; and wherein said signal beam and said M amount of waves of said reference beam have a wavelength and each of said relative displacements is of a length at least approximately equal to $$\frac{\lambda}{M\theta},$$

wherein $\lambda$ is the wavelength and $\theta$ is the separation angle.

3. A method of recording successive holograms in a recording medium, comprising:

providing at least a fan of M amount of waves along at least a first axis with a separation angle between adjacent waves and directing said fan of M waves as a reference beam along reference beam path onto said recording medium;

successively modulating a wave with a succession of images to produce a succession of signal beams along a signal beam path lying at a propagation angle relative to said reference beam path so that said signal and reference beams intersect at a beam intersection lying within said medium, said beam intersection having a size corresponding to beam areas of said reference and signal beams;

producing a succession of relative displacements a direction parallel to said first axis between said recording medium and said beam intersection of said signal and reference beam paths in synchronism with said succession of signal beams, each of said displacements being less than said size of said intersection whereby to record successive holograms partially overlapped along a direction of said displacements; and further comprising temporarily halting said succession of signal beams after a predetermined number of said relative displacements have been produced and moving said recording medium and said beam intersection relative to one another until said beam intersection does not intersect the first one of said holograms recorded with said succession of relative displacements, and then resuming the producing of a succession of signal beams and the producing of a succession of relative displacements.

4. The method of claim 3 wherein said predetermined number of relative displacements is equal to M.

5. The method of claim 4 wherein:

said signal beam and said M amount of waves of said reference beam have a wavelength, said recording medium has a thickness and said separation angle of said fan of M waves is at least approximately equal to $$\frac{\lambda}{L \tan\theta_s},$$

wherein $\lambda$ is the wavelength, L is the thickness, and $\theta_s$ is the propagation angle;

each of said displacements is of a length at least approximately equal to $$\frac{\lambda}{M\theta},$$

wherein $\lambda$ is the wavelength and $\theta$ is the separation angle.

6. A method of recording successive holograms in a recording medium, comprising:

providing at least a fan of M amount of waves along at least a first axis with a separation angle between adjacent waves and directing said fan of M waves as a reference beam along a reference beam path onto said recording medium;

successively modulating a wave with a succession of images to produce a succession of signal beams along a signal beam path lying at a propagation angle relative to said reference beam path so that said signal and reference beams intersect at a beam intersection lying within said medium, said beam intersection having a size corresponding to beam areas of said reference and signal beams;

producing a succession of relative displacements a direction parallel to said first axis between said recording medium and said beam intersection of said signal and reference beam paths in synchronism with said succession of signal beams, each of said displacements being less than said size of said intersection whereby to record successive holograms partially overlapped along a direction of said displacements;

wherein said providing comprises providing a two-dimensional fan of waves, said fan of M waves being comprised within said two-dimensional fan of waves, said two dimensional array comprising M waves along said first axis and N waves along a second axis, said M waves of said first axis being separated by said separation angle and said N waves of said second axis being separated by an other separation angle, said method further comprising producing an other relative displacement between said recording media and said beam intersection in a direction parallel to said second axis, said other relative displacement being less than said size of said beam intersection; and wherein said signal beam and said M amount of waves of said reference beam have a wavelength, said signal beam has a bandwidth and said second axis and said signal beam path are approximately normal to one another and said other separation angle is approximately equal to $$\sqrt{\lambda/L},$$

wherein $\lambda$ is the wavelength and L is the thickness.

7. A method of recording successive holograms in a recording medium, comprising:

providing at least a fan of M amount of waves along at least a first axis with a separation angle between adjacent waves and directing said fan of M waves as a reference beam along a reference beam path onto said recording medium;

successively modulating a wave with a succession of images to produce a succession of signal beams along a signal beam path lying at a propagation angle relative to said reference beam path so that said signal and reference beams intersect at a beam intersection lying within said medium, said beam intersection having a size corresponding to beam areas of said reference and signal beams;

producing a succession of relative displacements a direction parallel to said first axis between said recording medium and said beam intersection of said signal and reference beam paths in synchronism with said succession of signal beams, each of said displacements being less than said size of said intersection whereby to record successive holograms partially overlapped along a direction of said displacements;

wherein said providing comprises providing a two-dimensional fan of waves, said fan of M waves being comprised within said two-dimensional fan of waves, said two dimensional array comprising M waves along said first axis and N waves along a second axis, said M waves of said first axis being separated by said separation angle and said N waves of said second axis being separated by an other separation angle, said method further comprising producing an other relative displacement between said recording media and said beam intersection in a direction parallel to said second axis, said other relative displacement being less than said size of said beam intersection; and wherein said signal beam and said M amount of waves of said reference beam have a wavelength and said other relative displacement is approximately equal to $$\frac{\lambda}{N\theta'},$$

wherein $\lambda$ is the wavelength and $\theta'$ is the other separation angle of the second axis.

8. A method of reconstructing at a detection plane successive holograms previously recorded in a recording medium by interfering a succession of signal beams with a reference beam including a fan of M amount of waves, said fan being parallel to the path of said signal beams and having a separation angle between adjacent waves of the fan, while successively displacing said medium relative to said signal and reference beams in a direction parallel to said first axis by a distance less than the intersection of said reference and signal beams in said recording medium in synchronism with said succession of signal beams, said method of reconstructing comprising:

providing at least a fan of M amount of waves along at least a first axis corresponding to the direction of the reference beam with which said holograms were previously recorded with a separation angle between adjacent waves and directing said fan of M waves as a reference beam along a reference beam path onto said recording medium;

producing a succession of relative displacements a direction parallel to said first axis between said recording medium and said beam intersection of said signal and reference beam paths in synchronism with said succession of signal beams, each of said displacements being equal to the distance of said displacements with which said holograms were previously recorded;

detecting at said detection plane light diffracted from said reference beam by a succession of said previously recorded holograms; and wherein said first axis and said signal beam path are parallel and said signal beam and said M amount of waves of said reference beam have a wavelength, said recording medium has a thickness and said separation angle of said fan of M waves is at least approximately equal to $$\frac{\lambda}{L \tan\theta_s},$$

wherein $\lambda$ is the wavelength, L is the thickness, and $\theta_S$ is the propagation angle.

9. A method of reconstructing at a detection plane successive holograms previously recorded in a recording medium by interfering a succession of signal beams with a reference beam including a fan of M amount of waves, said fan being parallel to the path of said signal beams and having a separation angle between adjacent waves of the fan, while successively displacing said medium relative to said signal and reference beams in a direction parallel to said first axis by a distance less than the intersection of said reference and signal beams in said recording medium in synchronism with said succession of signal beams, said method of reconstructing comprising:

provide at least a fan of M amount of waves along at least a first axis corresponding to the direction of the reference beam with which said holograms were previously recorded with a separation angle between adjacent waves and directing said fan of M waves as a reference beam along a reference beam path onto said recording medium;

producing a succession of relative displacements a direction parallel to said first axis between said recording medium and said beam intersection of said signal and reference beam paths in synchronism with said succession of signal beams, each of said displacements being equal to the distance of said displacements with which said holograms were previously recorded;

detecting at said detection plane light diffracted from said reference beam by a succession of said previously recorded holograms; and wherein said signal beam and said M amount of waves of said reference beam have a wavelength and each of said relative displacements is of a length at least approximately equal to $$\frac{\lambda}{M\theta},$$

wherein $\lambda$ is the wavelength and $\theta$ is the separation angle.

10. A method of reconstructing at a detection plane successive holograms previously recorded in a recording medium by diffracting a succession of signal beams with a reference beam including a fan of M amount of waves, said fan being parallel to the path of said signal beams and having a separation angle between adjacent waves of the fan, while successively displacing said medium relative to said signal and reference beams in a direction parallel to said first axis by a distance less than the intersection of said reference and signal beams in said recording medium in synchronism with said succession of signal beams, said method of reconstructing comprising:

providing at least a fan of M amount of waves along at least a first axis corresponding to the direction of the reference beam with which said holograms were previously recorded with a separation angle between adjacent waves and directing said fan of M waves as a reference beam along a reference beam path onto said recording medium;

producing a succession of relative displacements a direction parallel to said first axis between said recording medium and said beam intersection of said signal and reference beam paths in synchronism with said succession of signal beams, each of said displacements being equal to the distance of said displacements with which said holograms were previously recorded;

detecting at said detection plane light diffracted from said reference beam by a succession of said previously recorded holograms; and further comprising temporarily halting said succession of signal beams after a predetermined number of said relative displacements have been produced and moving said recording medium and said beam intersection relative to one another until said beam intersection does not intersect the first one of said holograms recorded with said succession of relative displacements, and then resuming the producing of a succession of signal beams and the producing of a succession of relative displacements.

11. The method of claim 11 wherein said predetermined number of relative displacements is equal to M.

12. The method of claim 11 wherein: said signal beam and said M amount of waves of said reference beam have a wavelength, said recording medium has a thickness and said separation angle of said fan of M waves is at least approximately equal to $$\frac{\lambda}{L \tan\theta_s},$$

wherein $\lambda$ is the wavelength, L is the thickness, and $\theta_S$ is the propagation angle;

each of said displacements is of a length at least approximately equal to $$\frac{\lambda}{M\theta},$$

wherein $\lambda$ is the wavelength and $\theta$ is the separation angle.

13. A method of reconstructing at a detection plane successive holograms previously recorded in a recording medium by diffracting a succession of signal beams with a reference beam including a fan of M amount of waves, said fan being parallel to the path of said signal beams and having a separation angle between adjacent waves of the fan, while successively displacing said medium relative to said signal and reference beams in a direction parallel to said first axis by a distance less than the intersection of said reference and signal beams in said recording medium in synchronism with said succession of signal beams, said method of reconstructing comprising:

providing at least a fan of M amount of waves along at least a first axis corresponding to the direction of the reference beam with which said holograms were previously recorded with a separation angle between adjacent waves and directing said fan of M waves as a reference beam along a reference beam path onto said recording medium;

producing a succession of relative displacements a direction parallel to said first axis between said recording medium and said beam intersection of said signal and reference beam paths in synchronism with said succession of signal beams, each of said displacements being equal to the distance of said displacements with which said holograms were previously recorded;

detecting at said detection plane light diffracted from said reference beam by a succession of said previously recorded holograms;

wherein said providing comprises providing a two-dimensional fan of waves, said fan of M waves being comprised within said two-dimensional fan of waves, said two dimensional array comprising M waves along said first axis and N waves along a second axis, said M waves of said first axis being separated by said separation angle and said N waves of said second axis being separated by an other separation angle, said method further comprising producing an other relative displacement between said recording media and said beam intersection in a direction parallel to said second axis, said other relative displacement being less than said size of said beam intersection; and wherein said signal beam and said M amount of waves of said reference beam have a wavelength, said signal beam has a bandwidth and said second axis and said signal beam path are approximately normal to one another and said other separation angle is approximately equal to $$\sqrt{\lambda/L},$$

wherein $\lambda$ is the wavelength and L is the thickness.

14. A method of reconstructing at a detection plane successive holograms previously recorded in a recording medium by diffracting a succession of signal beams with a reference beam including a fan of M amount of waves, said fan being parallel to the path of said signal beams and having a separation angle between adjacent waves of the fan, while successively displacing said medium relative to said signal and reference beams in a direction parallel to said first axis by a distance less than the intersection of said reference and signal beams in said recording medium in synchronism with said succession of signal beams, said method of reconstructing comprising:

providing at least a fan of M amount of waves along at least a first axis corresponding to the direction of the reference beam with which said holograms were previously recorded with a separation angle between adjacent waves and directing said fan of M waves as a reference beam along a reference beam path onto said recording medium;

producing a succession of relative displacements a direction parallel to said first axis between said recording medium and said beam intersection of said signal and reference beam paths in synchronism with said succession of signal beams, each of said displacements being equal to the distance of said displacements with which said holograms were previously recorded;

detecting at said detection plane light diffracted from said reference beam by a succession of said previously recorded holograms;

wherein said providing comprises providing a two-dimensional fan of waves, said fan of M waves being comprised within said two-dimensional fan of waves, said two dimensional array comprising M waves along said first axis and N waves along a second axis, said M waves of said first axis being separated by said separation angle and said N waves of said second axis being separated by an other separation angle, said method further comprising producing an other relative displacement between said recording media and said beam intersection in a direction parallel to said second axis, said other relative displacement being less than said size of said beam intersection; and wherein said signal beam and said M amount of waves of said reference beam have a wavelength and said other relative displacement is approximately $$\frac{\lambda}{N\theta'},$$

wherein $\lambda$ is the wavelength and $\theta'$ is the other separation angle of the second axis.

* * * * *